(12) United States Patent
Yoshida

(10) Patent No.: US 6,427,533 B1
(45) Date of Patent: Aug. 6, 2002

(54) VEHICLE LIQUID LEVEL GAUGE

(75) Inventor: Susumu Yoshida, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/239,993

(22) Filed: Jan. 29, 1999

(30) Foreign Application Priority Data

Jan. 30, 1998 (JP) .......................................... 10-033810

(51) Int. Cl.$^7$ .......................... G01F 23/26; G01M 15/00
(52) U.S. Cl. .......................... 73/291; 73/304 C; 73/313; 340/618; 702/55
(58) Field of Search .............................. 73/290 R, 305, 73/309, 313, 304 C, 291; 340/612, 618, 620; 702/55

(56) References Cited

U.S. PATENT DOCUMENTS

| | | | | |
|---|---|---|---|---|
| 4,179,740 A | * | 12/1979 | Malin | 701/123 |
| 4,313,114 A | * | 1/1982 | Lee et al. | 340/870.23 |
| 4,402,048 A | * | 8/1983 | Tsuchida et al. | 701/123 |
| 4,444,051 A | * | 4/1984 | Yamaki et al. | 73/304 C |
| 4,470,296 A | | 9/1984 | Kobayashi et al. | |
| 4,810,953 A | * | 3/1989 | Huynh | 324/120 |
| 4,912,646 A | * | 3/1990 | Cerruti | 702/55 |
| 5,321,633 A | * | 6/1994 | Kataoka et al. | 73/304 R |

FOREIGN PATENT DOCUMENTS

| | | | |
|---|---|---|---|
| EP | A-0275240 | 7/1988 | |
| JP | 57211514 A | * 12/1982 | ................... 73/305 |
| JP | 601567 | 1/1985 | |

OTHER PUBLICATIONS

Patent Abstracts of Japan, Publication No. 01–257222, Publication Date: Oct. 13, 1989—Abstract Only.

* cited by examiner

Primary Examiner—Hezron Williams
Assistant Examiner—Michael Cygan
(74) Attorney, Agent, or Firm—Birch, Stewart, Kolasch & Birch, LLP

(57) ABSTRACT

A liquid level gauge for use on a vehicle indicates a liquid level in a start-up and in a running state in accordance with requirements designated by a user of the vehicle, the level being indicated with little or no time lag. Data detected in analog form by a fuel sensor is converted to digital signals by a sensor value reader. An indicator driver receives time signals from a timer and speed signals from a vehicle speed sensor and, in a suitably timed manner reflecting the vehicle speed, calculates fuel level data to be indicated based on the digital signals. The fuel level data thus calculated is indicated on a fuel level indicator. The fuel level data may be updated at intervals of one second if vehicle speed is less than 4 km/h and at intervals of 15 seconds if vehicle speed is at least 4 km/h. The indicator driver calculates the fuel level data using the digital signals unmodified or an average of digital signals obtained using a rapid averaging process, whereby fuel level is indicated with little or no time lag.

5 Claims, 4 Drawing Sheets

VEHICLE LIQUID LEVEL GAUGE

BACKGROUND OF THE INVENTION

1. Field of the Invention

The present invention relates generally to a liquid level gauge for use on a vehicle and, more particularly, to a liquid level gauge for indicating a liquid level in a tank on board a vehicle at response rates corresponding to the current speed of the vehicle on a real time basis.

2. Description of the Background Art

Heretofore, a number of proposals have been made regarding liquid level gauges for indicating the remaining quantity of a liquid such as fuel held in a tank mounted on board a vehicle. A conventional approach as disclosed Japanese Published Examined Patent Application No. Sho 60-1567 includes detecting a remaining fuel quantity in a fuel tank of a vehicle in terms of interelectrode capacitance, converting the detected value of interelectrode capacitance into an oscillation frequency of an RC oscillator, changing time intervals at which to measure a pulse count of the oscillation frequency between a stopped and a running state of the vehicle, and indicating the remaining fuel quantity on an indicator on the basis of an average of the measured pulse counts.

The following approach also disclosed in the above-noted Japanese Patent Publication includes using a float-equipped potentiometer type or a wire wound resistor type level gauge to detect the remaining fuel quantity in the fuel tank, inputting remaining quantity detection signals in analog form from the level gauge to an integrator for integration using different time constants between the stopped and the running state of the vehicle, and indicating the remaining fuel quantity on the indicator on the basis of the integrated value.

In a stopped state of the vehicle in accordance with the above-noted respective conventional approaches, the intervals at which to measure the pulse count are shortened and a shorter time constant is used in the integrator. In a running state of the vehicle in the above-noted respective conventional approaches, the measuring intervals are prolonged and a longer time interval is used in the integrator. These arrangements apparently allow the remaining fuel quantity to be indicated in a short time during a vehicle stopped state while permitting remaining fuel quantity indications through effective absorption of fuel level fluctuations during a vehicle running state.

However, conventional level gauges as above employ integrated values for indication purposes. Inevitably, averaging operations and concomitant time lags are introduced between actual and indicated remaining quantity. That is, the currently indicated remaining quantity at a given time merely represents an average of the quantities measured at points of time dozens of seconds and a few minutes prior to the given time. Accordingly, the value on the indicator is not the actual remaining quantity measured in real time.

In general, two-wheel vehicles (referred to as vehicle hereinafter) when parked have a side stand extended for support. Prior to being driven on the road, the side stand of the vehicle is folded off the ground so that the vehicle may run in an upright posture. Between the parked state (side stand extended) and the running state (side stand folded), the level in the fuel tank of the vehicle fluctuates and is often indicated as different values on the fuel indicator.

Motorcyclists sometimes begin driving the vehicle very short time after uprighting the vehicle from a parked position. In that short time period before activation, a precise fuel level measured during an upright posture of the vehicle must be indicated on the indicator.

The above-described conventional type of level gauge, however, involves determining and averaging a large number of actual liquid level measurements. The process necessarily requires extended time before the fluctuating liquid level is averaged and indicated on the indicator. In such cases, the motorcyclist begins riding the vehicle after checking the fuel level of the vehicle in a parked state with the side stand extended or after checking the fuel level while the vehicle is being uprighted from the parked state with the side stand folded. Accordingly, the motorcyclist must again check the fuel level while the vehicle is subsequently running in an upright posture.

A conventional approach to overcome the above-noted problem involves minimizing the averaging operation and the concomitant time lags between the actual and the indicated level by using time constants reduced to very small, almost negligible values. However, a problem with this conventional approach is that infinitesimal fluctuations of the liquid level can be picked up and presented as level indications that change too rapidly to be read meaningfully.

In addition, conventional level gauges are required to have three circuits: one for a larger time constant, another for a smaller time constant, and another for switching the two time constant circuits. These requirements complicate circuitry. An attempt to overcome this disadvantage includes replacing the three-circuit configuration with a conventional averaging circuit that performs averaging based on digital sampling. This requires switching between two averaging processes: one for totaling measurements taken in a relatively short time period of refueling and the other for totaling a large number of measurements taken over an extended period of time in the running state. As such, this conventional approach fails to provide simplified operating processes. In particular, the fact that the length to be averaged fluctuates, i.e. the population parameter for the division is varied, works against simplifying the operations involved. This is because averaging requires division.

SUMMARY OF THE INVENTION

It is therefore an object of the present invention to overcome the above and other deficiencies and disadvantages of conventional systems and to provide a liquid level gauge for use on a vehicle, the gauge indicating a liquid level of the vehicle in a start-up and a running state in accordance with requirements designated by a user of the vehicle, the level being indicated with little or no time lag.

The above and other objects may be fulfilled by providing a liquid level gauge for use on a vehicle, the gauge including a liquid tank mounted on board the vehicle; a liquid level detector for detecting a level of a liquid held in the liquid tank and for generating detection signals reflecting the detected level; an indicator driving controller for calculating, based on the detection signals, a value to be indicated to represent a liquid level; a liquid level indicator driven by the indicator driving controller; and a vehicle speed judgment unit for judging a speed of the vehicle. The indicator driving controller varies intervals at which to update data indicated on the liquid level indicator on the basis of judgments by the vehicle speed judgment unit. The indicator driving controller calculates the value to be indicated to represent the liquid level, based on values read from the liquid level detector within a time period shorter than the data updating intervals.

In a first preferred embodiment according to the invention, the intervals at which to update data indicated on the liquid level indicator are not greater than one second when the speed of the vehicle is less than five kilometers per hour, and are between five and sixty seconds when the speed of the vehicle is at least five kilometers per hour. In a second preferred embodiment according to the invention, at least the vehicle speed judging unit, the indicator driving controller and the liquid level indicator are housed in a case which accommodates a speedometer.

The invention when embodied in accordance with the above described features provides a liquid level gauge with little time lag in data indication on board the vehicle. That is, the inventive gauge allows the liquid level indicator to indicate, in real time or with a negligible time lag, liquid level data derived from the detection signals generated by the liquid level detector. The first preferred embodiment of the invention permits updating of liquid level data in less than one second if fuel level fluctuations are sufficiently small. This makes it possible to indicate precise level data in a suitably timed manner as required by the user of the vehicle. Furthermore, the second preferred embodiment enables provision of a liquid level gauge with a minimum number of components. This reduces assembling cost of the gauge.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
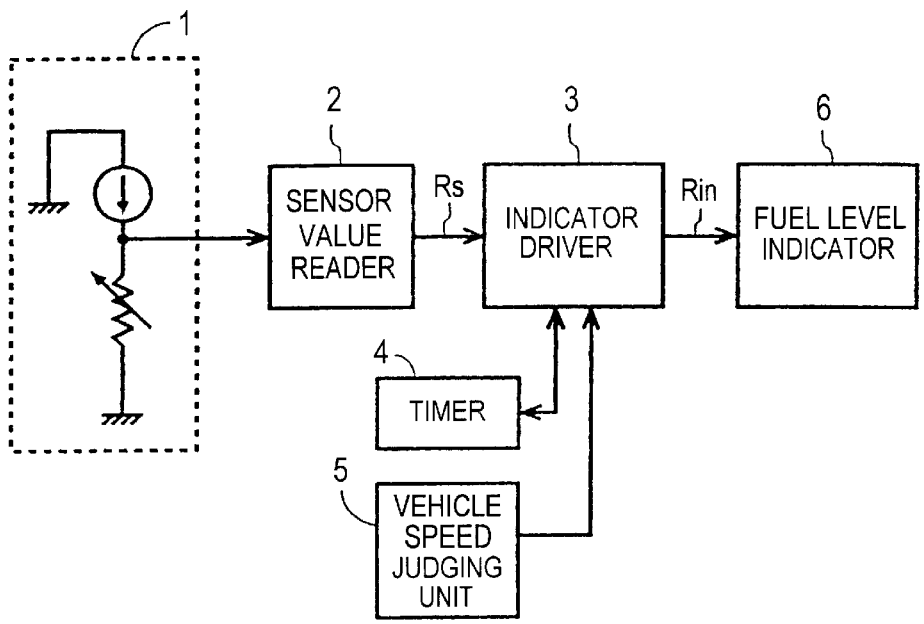
FIG. 1 is a block diagram of a liquid level gauge of a first embodiment of the invention.

FIG. 1 is a block diagram of a first preferred embodiment of the invention. Fuel sensor 1 is either a conventional float-equipped potentiometer type liquid level gauge or a wire wound resistor type liquid level gauge. The liquid level gauge combines a float and a brush integrally, the float floating on the liquid surface, the brush sliding along a resistor element. When the liquid level fluctuates, the float changes its position causing the brush to move along the resistor element. The moving brush varies the resistance value of the potentiometer or wire wound resistor. If a constant current is allowed to flow through the resistor element, the varying resistance value of the resistor element translates into output voltage variations that are output as detection signals. The fuel sensor 1 is not limited to the above-described types. Any other type of fuel sensor may be used.

The detection signals, i.e. voltage signals from the fuel sensor 1, are input to a sensor value reader 2. The sensor value reader 2 converts the analog voltage signals to digital form. An indicator driver 3 comprises a nonvolatile memory (e.g. ROM) that stores a predetermined program, a CPU that operates according to that program, a RAM, and an I/O unit. The indicator driver 3 receives voltage signals in digital form from sensor value reader 2, time signals from a timer 4, and vehicle speed signals from a vehicle speed judging unit 5, thereby generating liquid level data for indication. The indication data thus generated is retained temporarily in the RAM or the like. Subsequently, the indication data is transmitted to a fuel level indicator 6 through the I/O unit of indicator driver 3. Timer 4 may be an internal clock of indicator driver 3 or may be externally provided. Vehicle speed judging unit 5 may tap into a vehicle speed judging device used by a speedometer of the vehicle.

Figure 2:
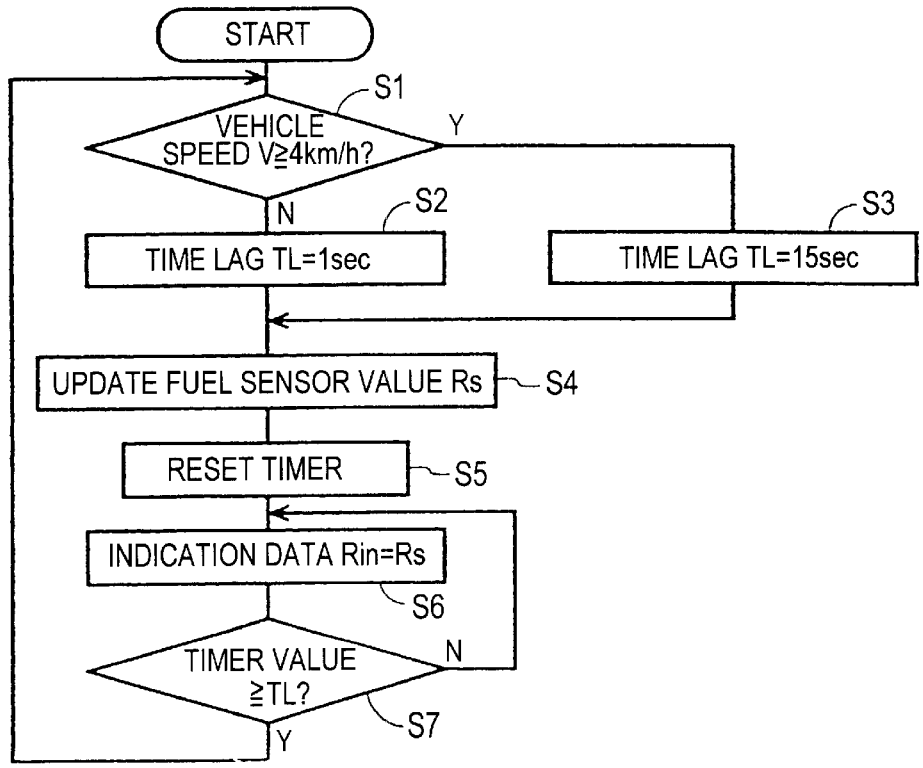
FIG. 2 is a flowchart of processing steps descriptive of operations of the liquid level gauge of FIG. 1.

Operation of indicator driver 3 will now be described with reference to the flowchart of FIG. 2. In step S1, determination is made whether a vehicle speed V is at least 4 km/h based on data from vehicle speed judging unit 5. If the result of the determination in step S1 is negative, a time lag TL of one second is set in step S2. If the vehicle speed V is determined as at least 4 km/h, a time lag TL of 15 seconds is set in step S3. The rationale for checking in step Si to see if the vehicle speed V is at least 4 km/h is as follows: if the vehicle is at most traveling as fast as a man walking (about 4 km/h), then the fuel level fluctuations in the vehicle are considered small and germane to precise level indications at short reading intervals (i.e. step S2 is reached in which the time lag TL is set for one second).

In step S4, data Rs detected by fuel sensor 1 is read from sensor value reader 2 and retained in the RAM within indicator driver 3. In step S5, timer 4 is reset. In step S6, a value based on the detected value Rs is set as indication data Rin on fuel level indicator 6. The value on the fuel level indicator 6 is thus updated and replaced by the data Rs.

In step S7, determination is made whether timer 4 has counted up to the end of time lag TL. If the result of determination in step S7 is negative, step S6 is repeated and the indication data Rin=Rs is maintained. If timer 4 has counted up to the end of time lag TL, flow returns to step S1 and the process is repeated.

As described, this embodiment permits indications of fuel level with no time lag at intervals of one second if the vehicle speed is less than 4 km/h, and at intervals of 15 seconds if the vehicle speed is at least 4 km/h. Even if the motorcyclist uprights the vehicle from the parked position (with the side stand extended) to begin riding in a very short time period, the fuel level measured in the upright position is indicated on fuel level indicator 6 by the time the vehicle is traveling. This allows the motorcyclist to verify the exact fuel level before starting a trip.

While the vehicle is running at speeds of at least 4 km/h, the fuel level indication is updated at intervals of 15 seconds. Fuel level fluctuations caused by the bumpy road surface are thus averaged over time. Fuel levels thus averaged are indicated without recourse to the conventional averaging process based on time-consuming calculations. Because the level indication does not change at inordinately short intervals, the motorcyclist can ascertain the fuel level in an unhurried manner while riding the vehicle.

Although the above embodiment sets time lag TL at one second if the vehicle speed V is less than 4 km/h and at 15 seconds if the vehicle speed V is at least 4 km/h, this is not limitative of the invention. A variation of this embodiment may have time lag TL set at one second when the vehicle speed V is less than 5 km/h and at 15 seconds when the speed is at least 5 km/h. In a still further variation of this embodiment, time lag TL is set as not greater than one second when vehicle speed V is less than 5 km/h and as between 5 and 60 seconds when vehicle speed V is at least 5 km/h.

Figure 3:
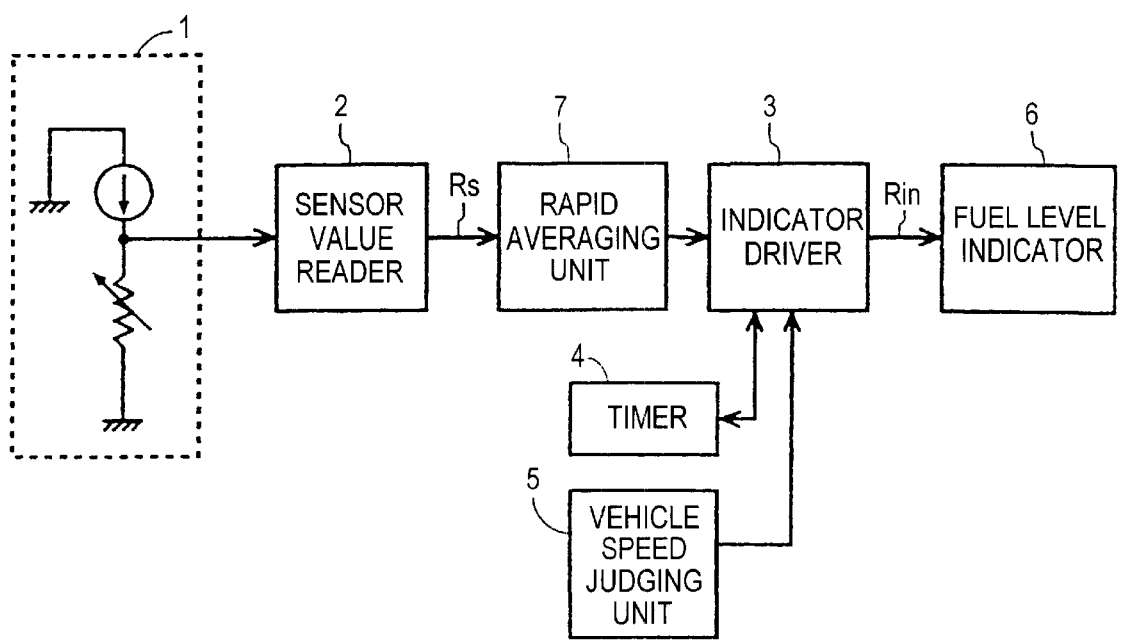
FIG. 3 is a block diagram of a liquid level gauge of a second embodiment of the invention.
Figure 4:
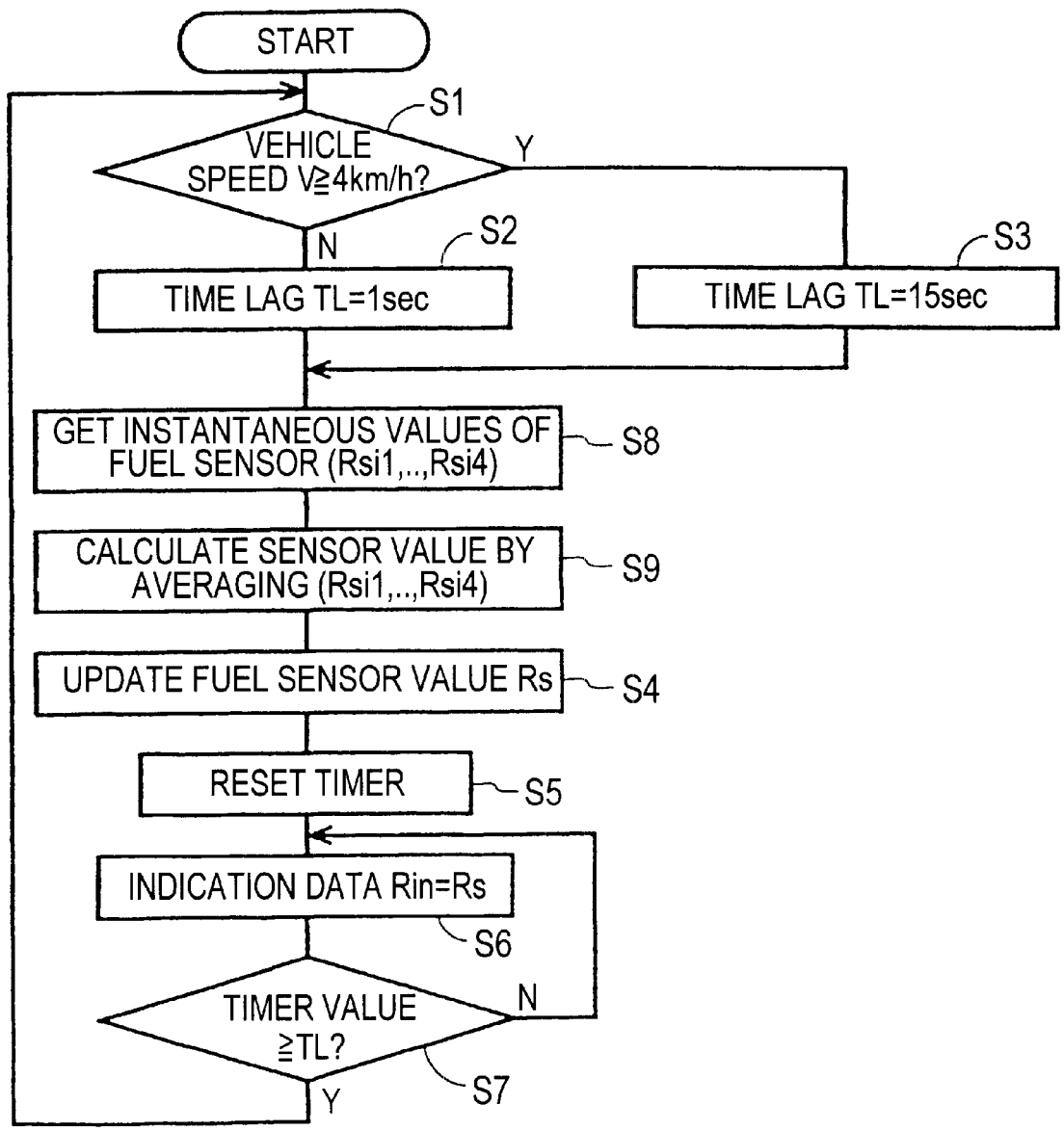
FIG. 4 is a flowchart of processing steps descriptive of operations of the liquid level gauge of FIG. 3.

A second embodiment of this invention will now be described with reference to FIGS. 3 and 4. FIG. 3 is a block diagram of the second embodiment and FIG. 4 is a flowchart of processing steps of the second embodiment. In FIGS. 3 and 4, like reference characters designate like or corresponding parts or steps already shown in FIGS. 1 and 2. The second embodiment differs from the first embodiment in two points: a rapid averaging unit 7 is interposed between sensor value reader 2 and indicator driver 3, and a rapid averaging process constituted by steps S8 and S9 (FIG. 4) is introduced before step S4.

Rapid averaging unit 7, in step S8 of FIG. 4, receives a limited, small number of data items (Rsi1, . . . , Rsi4) in a very short time from among the latest data Rs detected by sensor value reader 2. In step S9, rapid averaging unit 7 averages the received data items. For example, the most recent four items of data Rs detected by sensor value reader 2 are selected every 0.2 seconds, acquired and averaged into an arithmetic mean. In general, 2n data items in binary notation are averaged into an arithmetic mean by carrying out as many as "n" shift operations. That is, averaging four data items requires performing only two shift operations. Arithmetic means are thus acquired very rapidly and in a constant time period for each averaging process.

If rapid averaging unit 7 for averaging four detected data items is to be constituted by hardware, only a single adder and a few shift registers are needed. The components are inexpensive when assembled and they operate at a consistent, high speed.

As described, the second embodiment receives a limited, small number of data items (Rsi1, . . . , Rsi4) in a very short time from among the latest data Rs detected by sensor value reader 2, and averages the data items thus gained. Even if apparently abnormal values are detected, this embodiment including an averaging process is capable of indicating level data minimally affected by the abnormal values and with little time lag.

In a modification of the second embodiment, rapid averaging unit 7 may be placed between fuel sensor 1 and sensor value reader 2, the averaging unit being constituted by a CR filter having a consistent, very small time constant. The CR filter serves to rapidly smooth out variations of the detection signals from fuel sensor 1.

The inventive liquid level gauge may be mounted on the vehicle preferably as follows: the vehicle speed judging unit 5, indicator driver 3 and fuel level indicator 6 shown in FIG. 1 are housed in a case that accommodates a speedometer. A vehicle speed judging device used by the speedometer is also used as vehicle speed judging unit 5 for fuel level indication. This setup enables the indicator driver 3 to be located near the vehicle speed judging device of the speedometer. The manner in which indicator driver 3 is installed here involves shorter wiring, fewer parts and hence lower manufacturing cost than if indicator driver 3 were housed in an enclosure separate from the case accommodating the speedometer. In particular, if the speedometer is an electrically operated meter, the above arrangement is all the more advantageous in that it places the vehicle speed judging unit, indicator driver and other related parts on the same circuit board for speed indication.

Figure 5:
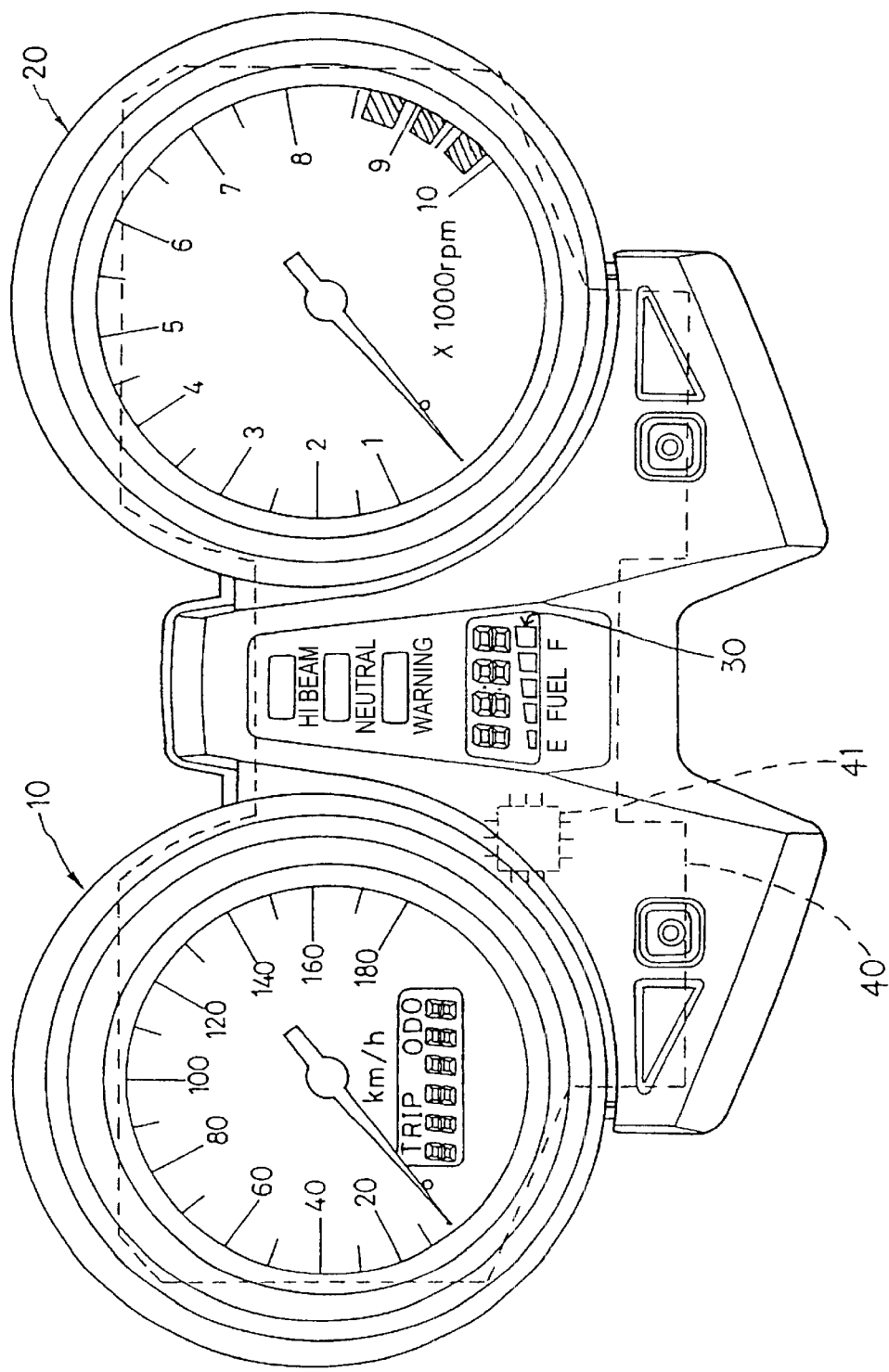
FIG. 5 is a front view of an instrument panel including the fuel level indicator and an outline of the shape of a circuit board for a speedometer.

FIG. 5 shows a typical fuel level gauge mounted on a vehicle. Between a speedometer 10 and a tachometer 20 is a fuel level gauge 30 including bar graph indications. The case of speedometer 10 contains a circuit board having a shape indicated with broken lines 40. A driving circuit (LSI) for fuel level gauge 30 may be positioned in a given region (e.g. position 41) on the circuit board.

As described, the inventive liquid level gauge for use on a vehicle indicates liquid level data on an indicator in real time or with a negligible time lag in a suitably timed manner as required by the user of the vehicle. In particular, if the motorcyclist uprights the vehicle from the parked position to being riding in a very short time period, the exact fuel level measured in the upright position is indicated on the indicator by the time the vehicle starts traveling. This allows the motorcyclist to rely on the indication as the precise quantity of the remaining fuel in the vehicle.

The major components of the inventive gauge are incorporated in the casing of the speedometer. This makes it possible to mount a level gauge made of a limited number of components on the vehicle at a reduced assembling cost.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid level gauge for a vehicle, comprising:

a liquid tank mounted on the vehicle;

liquid level detecting means for detecting a level of a liquid in said liquid tank and for generating detection signals indicative of detected levels of the liquid;

vehicle speed judging means for determining a speed of the vehicle; and indicator driving means for calculating a tank liquid level value to be indicated as a liquid level of said liquid tank, said tank liquid level value being calculated without averaging said generated detection signals at least when the determined speed of the vehicle is below a predetermined speed value;

said indicator driving means varying an update interval at which the liquid level indicated on said liquid level indicating means is updated in accordance with the determined speed of the vehicle, said indicator driving means calculating the tank liquid level value to be indicated based on values read from said liquid level detecting means within a time period shorter than the updated intervals.

2. The liquid level gauge of claim 1, wherein at least said vehicle speed judging means, said indicator driving means and said liquid level indicating means are housed in a case which accommodates a vehicle speedometer.

3. The liquid level gauge of claim 1, wherein said indicator driving means calculates a tank liquid level value to be indicated as the liquid level based on a specific number of detection signals provided by said liquid level detecting means.

4. The liquid level gauge of claim 1, further comprising smoothing means for smoothing the detection signals provided from said liquid level detecting means.

5. The liquid level gauge of claim 1, wherein the update intervals are not greater than one second when the determined speed of the vehicle is less than five kilometers per hour and the update intervals are between five and sixty seconds when the determined speed of the vehicle is at least five kilometers per hour.

* * * * *